Sept. 6, 1938. A. L. PARKER 2,129,231
SELECTOR VALVE
Filed Aug. 27, 1936   2 Sheets-Sheet 1
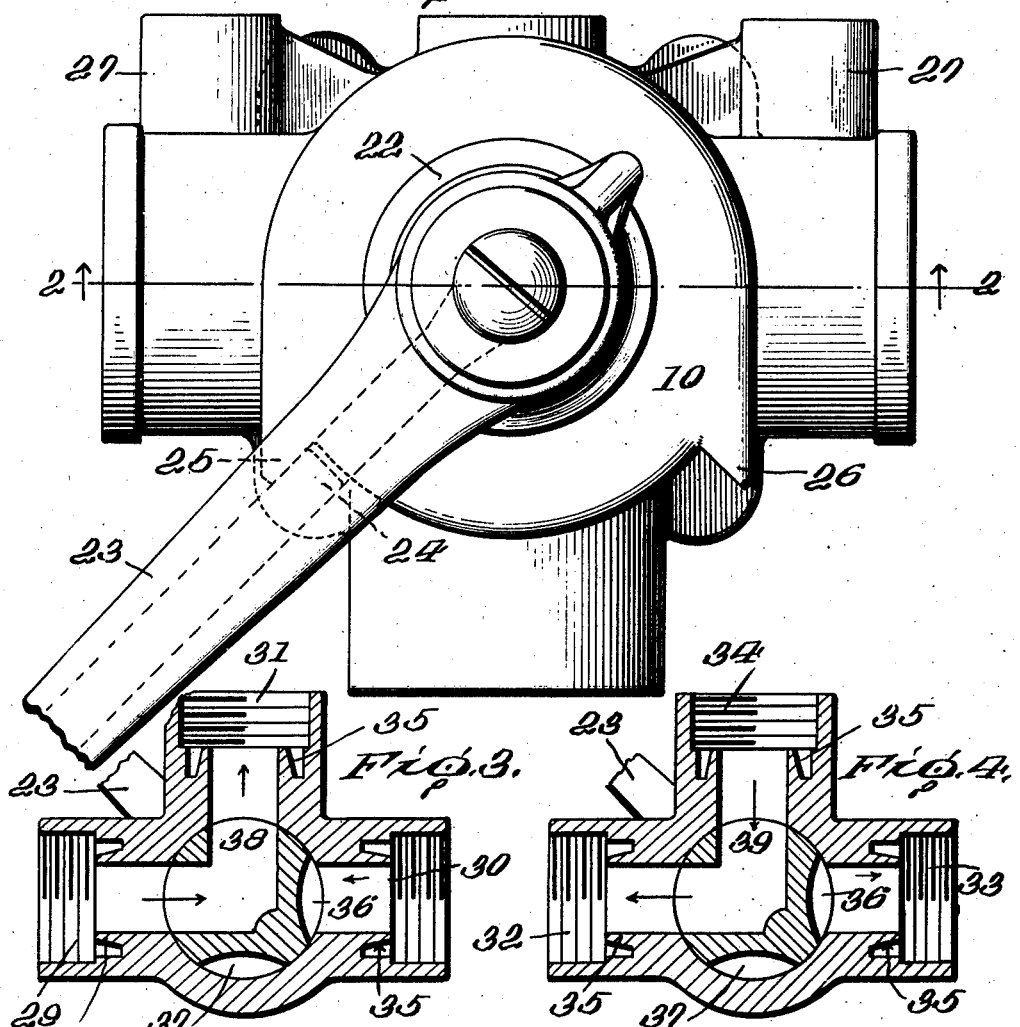

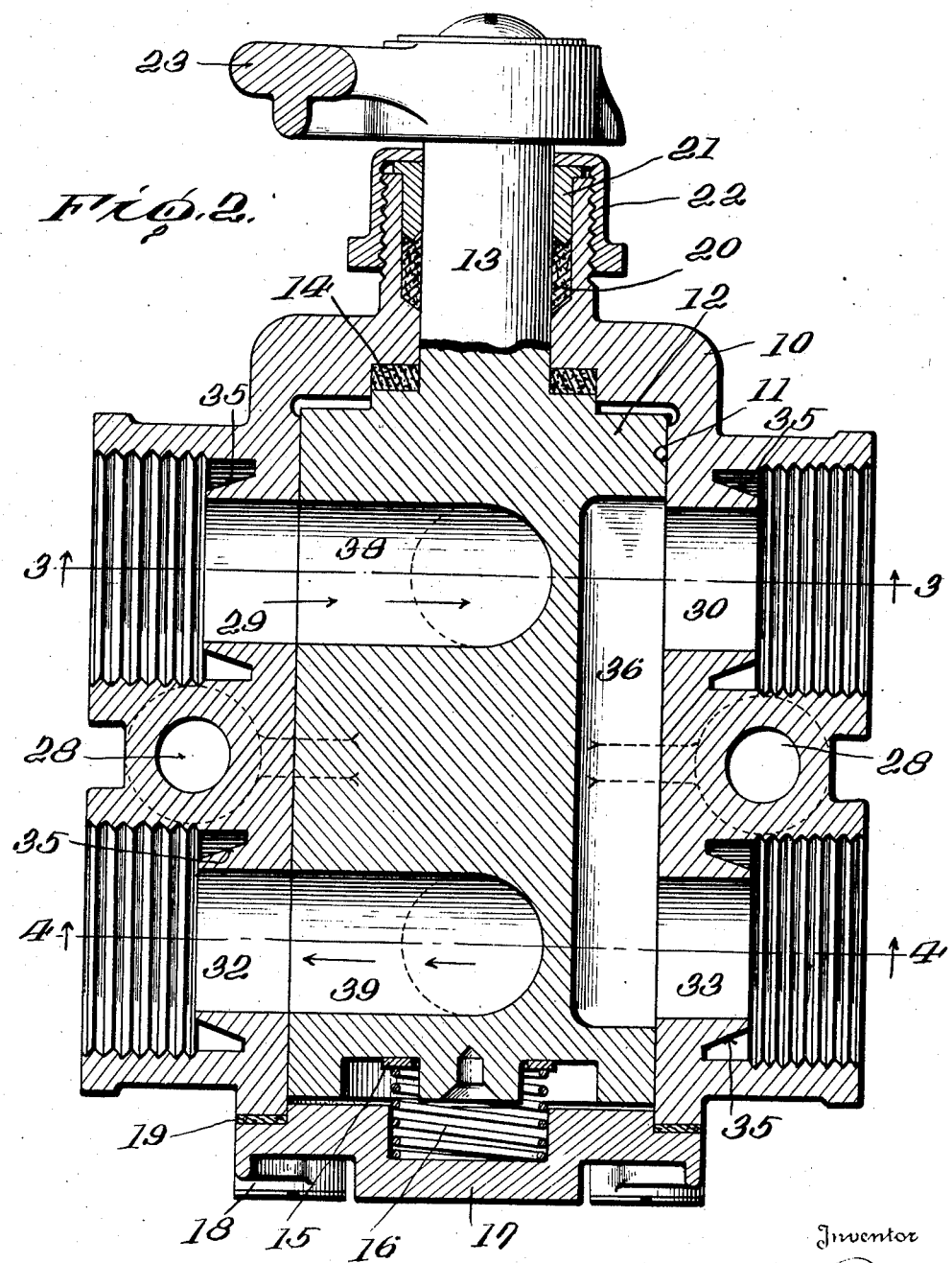

Patented Sept. 6, 1938

2,129,231

UNITED STATES PATENT OFFICE 2,129,231

SELECTOR VALVE

Arthur L. Parker, Cleveland, Ohio

Application August 27, 1936, Serial No. 98,253

1 Claim. (Cl. 251—104)

This invention relates to new and useful improvements in a selector valve for controlling the flow of fluid from two independent sources, so that either one may be selected, provision being made at the same time for a return overflow. In connection with internal combustion engines, for example, wherever two fuel tanks are used, as is frequently the case in aircraft, it becomes necessary to provide means for switching from one tank to the other.

It is also customary to supply the fuel at a predetermined pressure, the overflow being returned to the intake side of the pump.

It is an object of the present invention to provide a single valve which may be used to select a fluid supply under pressure from either one of two sources and to return the overflow to its source.

A further object of the invention is to provide means whereby the same valve by-passes the fluid from the source not selected, permitting it to flow freely in a short closed circuit. This involves a six-way valve with a single plug.

The invention will be more particularly explained in connection with the accompanying drawings, in which,—

Fig. 1 is a plan view of a valve in which the invention is embodied.

Fig. 2 is a section taken on the line 2—2 of Fig. 1.

Fig. 3 is a section on a reduced scale taken on the line 3—3 of Fig. 2.

Fig. 4 is a similar section taken on the line 4—4 of Fig. 2.

Fig. 5 is a view similar to Fig. 3, but with the valve in a different position.

Fig. 6 is a view similar to Fig. 4, but with the valve in the same position as in Fig. 5.

In accordance with the invention, the valve comprises a housing 10 with a central bore 11 within which is a rotary plug 12 with a stem 13 projecting through the top of the housing. At its upper end, the plug 12 seats against a gasket 14. The lower end of the housing is closed by a suitable cap 17 secured by screws 18 and sealed with a gasket 19. The cap is recessed to receive and support a spring 16. This spring bears against a washer 15 which in turn bears against the rotary plug. The purpose of the spring is to hold the valve seated against the gasket 14 while permitting free shiftable movements of the same to different set positions.

The stem 13 is provided with suitable packing 20, a follower 21, and a screw-threaded cap 22. A handle 23 is secured to the upper end of the stem 13 and is formed with a depending lug 24, which engages a shoulder 25 on the housing to limit the rotation of the valve in one direction and engages a shoulder 26 to limit the rotation in the opposite direction. The back side of the housing is provided with lugs 27 having holes 28 therein, through which screws or bolts may be inserted to secure the housing to a suitable supporting panel.

The housing 10 is formed with ports 29, 30 and 31 in the plane of Fig. 3, and with ports 32, 33 and 34 in the plane of Fig. 4. Around each port is a tapered seat 35, against which the connecting pipe is secured.

The plug 12 is formed with two longitudinal channels 36 and 37, and with two L-shaped channels 38 and 39.

Assuming that fluid is to be supplied from either one of two tanks and delivered from the port 31 under pressure and that the overflow is to be returned through the port 34, the intake side of the first pump is connected to the first tank and to the port 32, and its output side is connected to the port 29. The intake side of the second pump is connected to the second tank and to the port 33, and its output side is connected to the port 30.

When the handle 23 is in the position shown in Figs. 1 to 4, fluid will be drawn from the first tank and delivered by the pump through the port 29, passageway 38 and port 31 to the point of utilization, while the overflow will be returned through the port 34, passageway 39 and port 32 to the intake side of the pump. In the meantime, the second pump idles, as the fluid delivered to the port 30 is short-circuited through the by-pass 36 directly to the port 33 and thence back to the intake side of the pump.

When the handle is in the position shown in Figs. 5 and 6, the fluid delivered by the second pump to the port 30 will flow through the passageway 38 and port 31 to the point of utilization, while the overflow will be returned through the port 34, passageway 39 and port 33 back to the intake side of the pump. In the meantime, the first pump idles, as the fluid delivered therefrom to the port 29 is short-circuited directly through the by-pass 37 to the port 32 and thence back to the intake side of the pump.

It may be observed that the by-pass 36 could be in communication with the by-pass 37 without affecting the operation of the valve.

The structure of the valve, as herein shown and described, the connections therefor, and the manner in which the valve may be used are presented merely for the purpose of illustration. It is to be understood that the invention embraces all such modifications thereof as may fall within the scope of the appended claim.

Having thus described the invention, what I claim as new and desire to secure by Letters Patent, is:—

A valve comprising a housing having a cylindrical bore, a plug valve located in said cylindrical bore, said housing having diametrically opposed ports adjacent one end of said bore and an intermediate port at right angles to the first-named ports, said housing also having radially disposed ports adjacent the other end of said bore with a similarly arranged intermediate port, said plug valve having an L-shaped port extending therethrough and disposed so as to connect selectively said diametrically opposed ports with said intermediate port at one end of said bore and another L-shaped port adapted to selectively connect the other diametrically arranged ports in the housing with the intermediate port associated therewith, and said plug valve having ports extending longitudinally thereof and disposed so as to connect selectively one of the diametrically arranged ports at one end of the bore with the similarly arranged port adjacent the other end of said bore.

ARTHUR L. PARKER.